US011777775B2

(12) United States Patent
Harada et al.

(10) Patent No.: US 11,777,775 B2
(45) Date of Patent: Oct. 3, 2023

(54) USER TERMINAL AND RADIO COMMUNICATION METHOD

(71) Applicant: NTT DOCOMO, INC., Tokyo (JP)

(72) Inventors: Hiroki Harada, Tokyo (JP); Daiki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/618,699

(22) PCT Filed: Jun. 2, 2017

(86) PCT No.: PCT/JP2017/020700
§ 371 (c)(1),
(2) Date: Dec. 2, 2019

(87) PCT Pub. No.: WO2018/220854
PCT Pub. Date: Dec. 6, 2018

(65) Prior Publication Data
US 2020/0119965 A1 Apr. 16, 2020

(51) Int. Cl.
*H04L 27/26* (2006.01)
*H04L 5/00* (2006.01)
(Continued)

(52) U.S. Cl.
CPC ........ *H04L 27/2613* (2013.01); *H04L 5/0007* (2013.01); *H04L 5/10* (2013.01); *H04L 27/2655* (2013.01); *H04W 56/0015* (2013.01)

(58) Field of Classification Search
CPC ..... H04L 27/2655; H04L 5/0007; H04L 5/10; H04L 27/2613; H04W 56/0015; H04W 48/16; H04W 56/00; H04W 72/04
See application file for complete search history.

(56) References Cited

U.S. PATENT DOCUMENTS

2018/0248642 A1* 8/2018 Si .................. H04J 11/0076
2018/0262308 A1* 9/2018 Si .................. H04L 5/0051
(Continued)

FOREIGN PATENT DOCUMENTS

| CN | 108809568 A | 11/2018 |
|---|---|---|
| EP | 4087163 A1 | 11/2022 |
| WO | 2018-204260 A1 | 11/2018 |

OTHER PUBLICATIONS

Extended European Search Report issued in counterpart European Patent Application No. 17911886.4, dated Dec. 22, 2020 (11 pages).
(Continued)

*Primary Examiner* — Sharmin Chowdhury
(74) *Attorney, Agent, or Firm* — Osha Bergman Watanabe & Burton LLP

(57) ABSTRACT

In order to transmit and receive signals properly in a radio communication system in which communication is performed based on different formats than in existing LTE systems, a user terminal, according to one aspect of the present invention, has a receiving section that receives a synchronization signal block, which contains a plurality of synchronization signals and a plurality of broadcast channels that are allocated in different time fields, and a control section that selects time information of the synchronization signal block based on the broadcast channels and/or demodulation reference signals allocated in the same time fields with the broadcast channels, and the synchronization signal block contains broadcast channels that are allocated in three or more time fields, including at least contiguous time fields, respectively.

7 Claims, 13 Drawing Sheets

(51) Int. Cl.
*H04L 5/10* (2006.01)
*H04W 56/00* (2009.01)

(56) References Cited

U.S. PATENT DOCUMENTS

| | | | |
|---|---|---|---|
| 2018/0324678 A1* | 11/2018 | Chen | H04W 24/10 |
| 2019/0058620 A1* | 2/2019 | Liu | H04L 5/0053 |
| 2019/0394736 A1* | 12/2019 | Huang | H04L 5/10 |
| 2021/0092700 A1 | 3/2021 | Ko et al. | |
| 2021/0194745 A1 | 6/2021 | Pan et al. | |

OTHER PUBLICATIONS

NTT Docomo, Inc.; "Discussion and evaluation on NR-PBCH design"; 3GPP TSG RAN WG1 Meeting #89, R1-1708439; Hangzhou, P.R. China, May 15-19, 2017 (8 pages).

NTT Docomo, Inc.; "Discussion on SS block time index indication"; 3GPP TSG RAN WG1 Meeting #89, R1-1708438; Hangzhou, P.R. China, May 15-19, 2017 (4 pages).

Samsung; "SS block composition and SS burst set composition"; 3GPP TSG RAN WG1 #89, R1-1707927; Hangzhou, P.R. China, May 15-19, 2017 (10 Pages).

Sony; "Discussion on SS block time index indication"; 3GPP TSG RAN WG1 Meeting #89, R1-1708253; Hangzhou, P.R. China, May 15-19, 2017 (5 Pages).

Interdigital Inc.; "On SS Block and Burst Set Composition and Multiplexing"; 3GPP TSG RAN WG1 Meeting #89, R1-1708324; Hangzhou, P.R. China, May 15-19, 2017 (7 Pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 Pages).

Written Opinion of the International Searching Authority issued in PCT/JP2017/020700 dated Aug. 8, 2017 (5 Pages).

International Search Report issued in PCT/JP2017/020700 dated Aug. 8, 2017 (2 Pages).

Office Action issued in the counterpart Chinese Patent Application No. 201780093625.9, dated Jul. 23, 2021 (13 pages).

Office Action issued in Indian Application No. 201937049798 dated Feb. 4, 2022 (5 pages).

Office Action issued in the counterpart Chinese Patent Application No. 201780093625.9, dated Dec. 9, 2021 (16 pages).

Office Action issued in European Application No. 17911886.4, dated Feb. 14, 2023 (7 pages).

\* cited by examiner

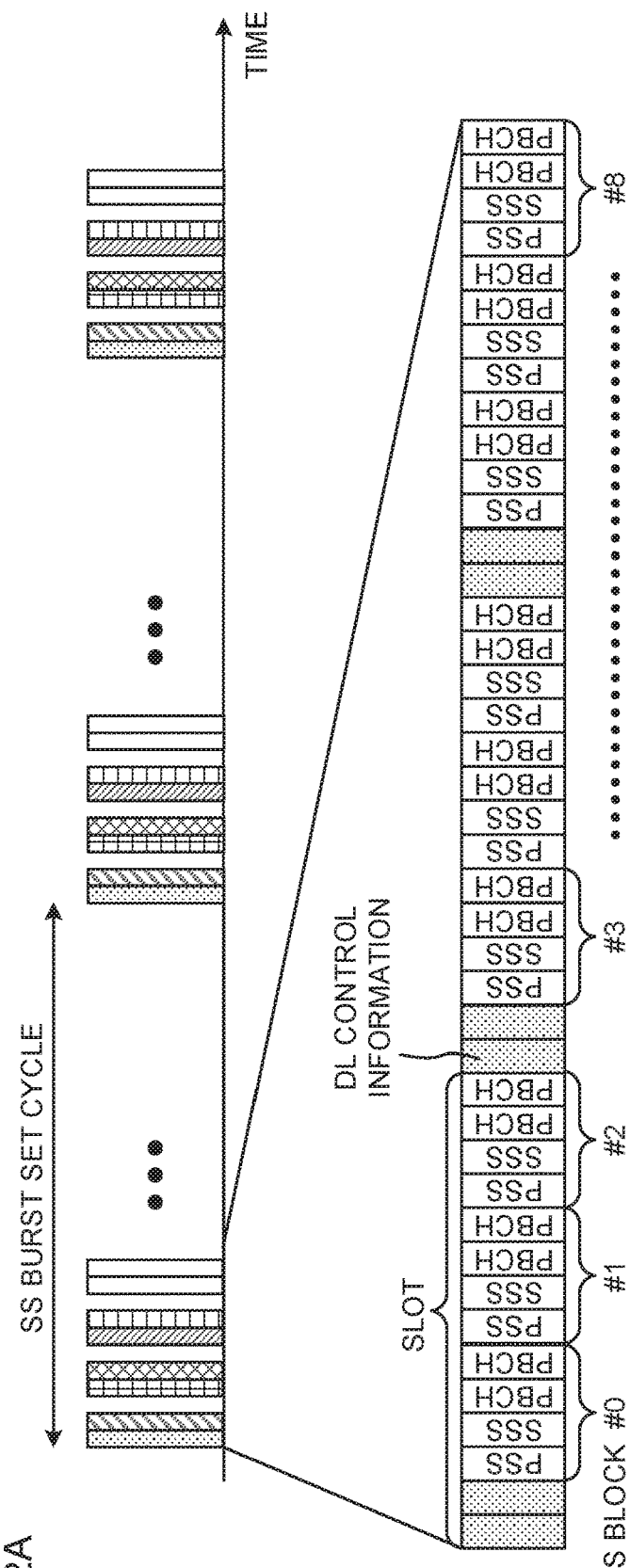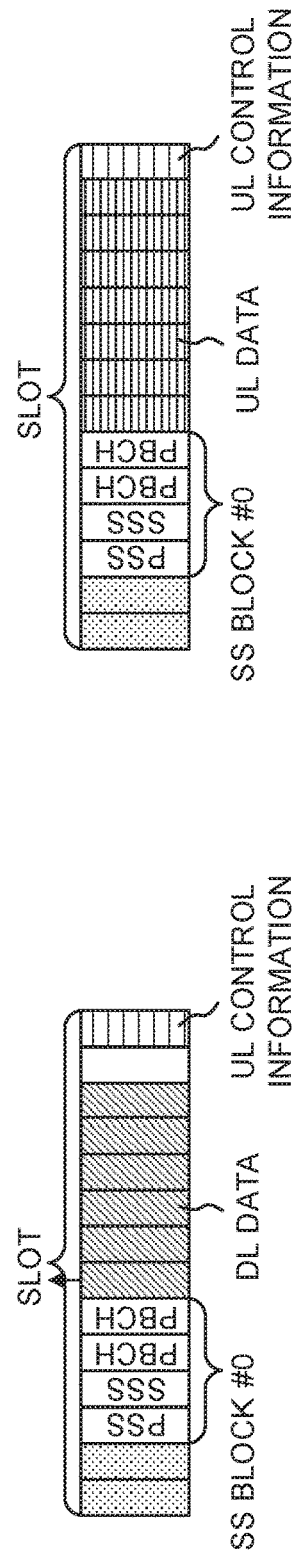

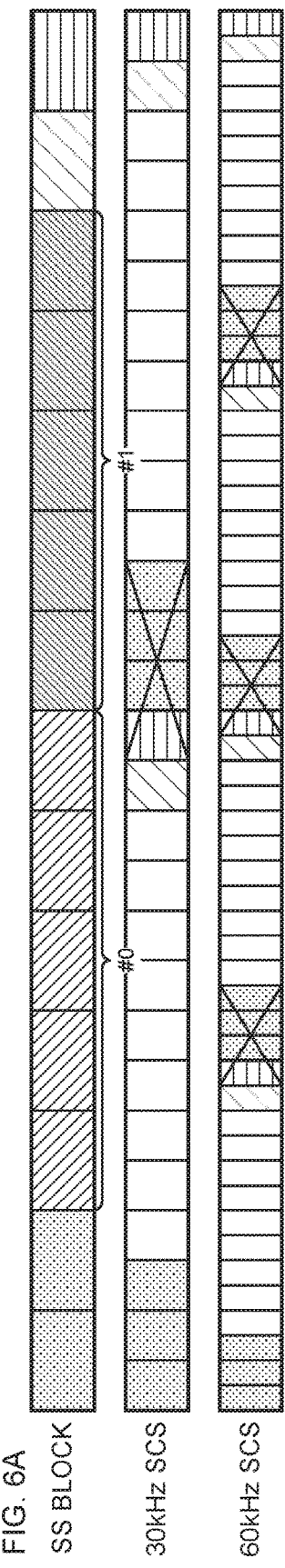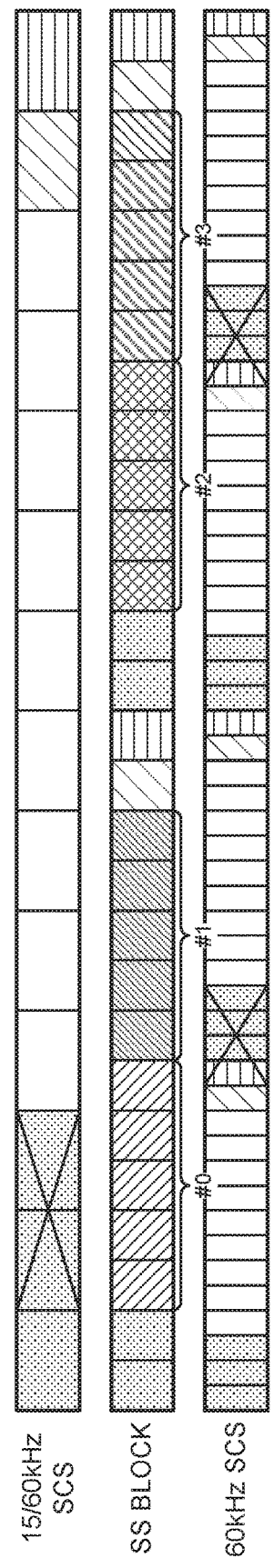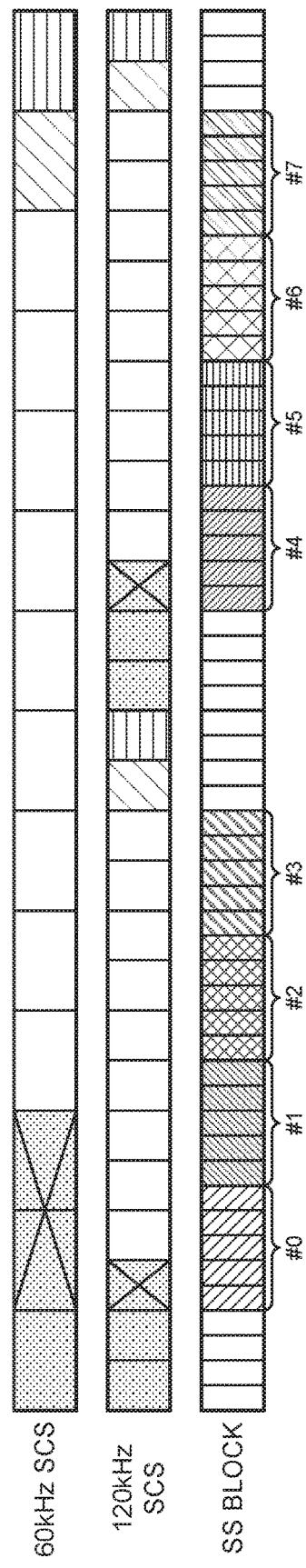
FIG. 6A
FIG. 6B
FIG. 6C

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," "LTE Rel. 12" or "LTE Rel. 13") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 14," "LTE Rel. 15" or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. In addition, in CA, multiple CCs under the same radio base station (eNB (eNodeB)) are configured in a user terminal (UE (User Equipment)).

Meanwhile, in LTE Rel. 12, dual connectivity (DC), in which multiple cell groups (CGs) formed with different radio base stations are configured in a UE, is also introduced. Each cell group is comprised of at least one cell (or CC). In DC, since multiple CCs of different radio base stations are integrated, DC is also referred to as "inter-eNB CA."

Also, in existing LTE systems (for example, LTE Rel. 8 to 13), synchronization signals (PSS/SSS), broadcast channel (PBCH) and so on which a user terminal uses in initial access procedures are allocated, on a fixed basis, in fields that are determined in advance. By detecting the synchronization signals in cell search, the user terminal can establish synchronization with the network, and, furthermore, identify the cell (for example, cell ID) which the user terminal should connect with. Furthermore, the user terminal can acquire system information by receiving the broadcast channel (PBCH and SIB) after the cell search.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Future radio communication systems (for example, 5G, NR, etc.) are expected to realize various radio communication services so as to fulfill mutually varying requirements (for example, ultra high speed, large capacity, ultra-low latency, etc.). For example, regarding 5G/NR, studies are in progress to provide radio communication services, referred to as "eMBB (enhanced Mobile Broad Band)," "IoT (Internet of Things)," "mMTC (massive Machine Type Communication)," "M2M (Machine To Machine)," and "URLLC (Ultra Reliable and Low Latency Communications)."

In addition, 5G/NR is expected to support flexible use of numerologies and frequencies, and realize dynamic frame configurations. Here, "numerology" refers to communication parameters in the frequency direction and/or the time direction (for example, at least one of the subcarrier spacing (subcarrier interval), the bandwidth, the symbol duration, the time duration of CPs (CP duration), the subframe duration, the time duration of TTIs (TTI duration), the number of symbols per TTI, the radio frame configuration, the filtering process, the windowing process, and so on).

However, how to control transmission/receipt when different numerologies (subcarrier spacing, bandwidth etc.) from those of existing LTE systems are supported is not decided yet. In 5G/NR, a study is in progress to provide services using a very high carrier frequency of 100 GHz, and on the assumption that DL transmission is performed using different methods from those of existing LTE systems. For example, study is underway to transmit DL signals such as synchronization signals and broadcast channels for use in initial access and so on, based on different formats than in existing LTE systems.

In this case, control techniques (for example, signal mapping method) for use in existing LTE systems cannot be applied to DL transmission control in future radio communication systems on an as-is basis, and new transmission control methods are required.

The present invention has been made in view of the above, and it is therefore an object of the present invention to provide a user terminal and a radio communication method, whereby signals can be transmitted and received properly in a radio communication system where communication is carried out using different formats from those of existing LTE systems.

Solution to Problem

According to one aspect of the present invention, a user terminal has a receiving section that receives a synchronization signal block, which contains a plurality of synchronization signals and a plurality of broadcast channels that are allocated in different time fields, and a control section that selects time information of the synchronization signal block based on the broadcast channels and/or demodulation reference signals allocated in the same time fields with the broadcast channels, and the synchronization signal block contains broadcast channels that are allocated in three or more time fields, including at least contiguous time fields, respectively.

Advantageous Effects of Invention

According to the present invention, signals can be transmitted and received properly in a radio communication system where communication is carried out using different formats from those of existing LTE systems.

BRIEF DESCRIPTION OF DRAWINGS

FIGS. 2A to 2C are diagrams to explain the concept of SS blocks;

FIGS. 6A to 6C are diagrams to show examples of locations for allocating SS blocks according to the present embodiment;

DESCRIPTION OF EMBODIMENTS

Figure 1A:
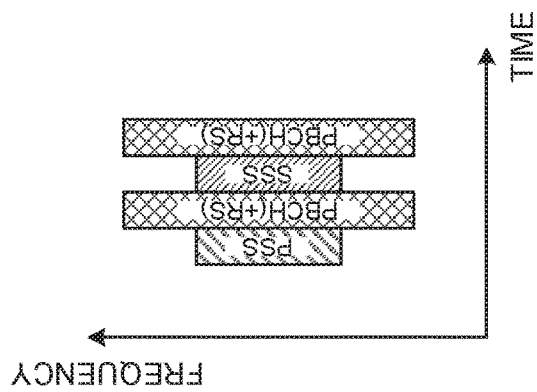
FIGS. 1A to 1D are diagrams to show examples of SS block formats.

In the initial access process in existing LTE systems, a user terminal can at least detect time/frequency synchronization and a cell indicator (cell ID) by detecting synchronization signals (PSS/SSS). Also, after having established synchronization with the network and captured the cell ID, the user terminal receives a broadcast channel (for example, PBCH), which contains system information. Following the detection of synchronization signals and demodulation of a broadcast channel, the user terminal, for example, receives SIBs (System Information Blocks), transmits a PRACH (Physical Random Access Channel), and so on.

As described above, in existing LTE systems, a user terminal receives system information (broadcast information) that is necessary for downlink communication, in, for example, the MIB (Master Information Block), which is transmitted in the broadcast channel (PBCH). The broadcast channel for existing LTE systems (LTE-PBCH) is transmitted in subframe #0 in each radio frame, in a cycle of 10 msec, in a center band of 1.4 MHz (6 RBs in the center).

In the PBCH (MIB), information that is necessary to receive the downlink (downlink bandwidth, downlink control channel format, system frame number (SFN), etc.) is set forth in certain bits. The user terminal controls receipt of SIBs (System Information Blocks), which are communicated in the downlink shared data channel (PDSCH), based on the LTE-PBCH. By receiving SIBs, the user terminal can acquire minimum system information that is necessary to make communication.

Also, the locations to allocate synchronization signals (LTE-PSS/SSS) and the broadcast channel (LTE-PBCH) in existing LTE systems are fixed in time resources and frequency resources. To be more specific, LTE-PSS/SSS and the broadcast channel are mapped to the same frequency field (for example, 6 RBs at the center frequency) and transmitted. Thus, LTE-PSS/SSS and LTE-PBCH are transmitted from radio base stations in fixed resources, so that LTE-PSS/SSS and LTE-PBCH can be received without sending a special notice to the user terminal.

Even in future radio communication systems, a user terminal needs to receive synchronization signals and system information (MIB and/or SIB) in the initial access process and so on in order to perform communication using a newly introduced carrier (also referred to as "NR carrier (cell)").

<SS Blocks>

5G/NR are under study to define a resource unit that at least contains synchronization signals (for example, NR-PSS and/or NR-SSS (hereinafter also referred to as "NR-PSS/SSS")) and broadcast channels (for example, NR-PBCHs) as an "SS block," and allow communication using these SS blocks.

An SS block (synchronization signal block) is comprised of a plurality of contiguous OFDM symbols. For example, an NR-PSS symbol, an NR-SSS symbol and NR-PBCH symbols are allocated in a row. To be more specific, studies are in progress to allocate NR-PBCHs in 2 symbols, and form an SS block with 1 NR-PSS symbol, 1 NR-SSS symbol and 2 NR-PBCH symbols (a total of 4 symbols).

Figure 1B:
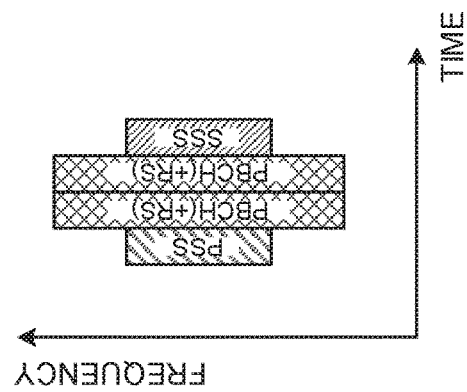
Figure 1C:
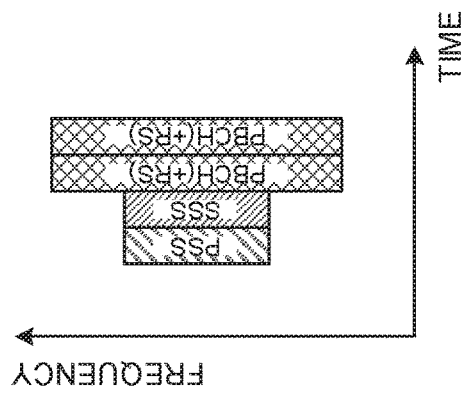
Figure 1D:
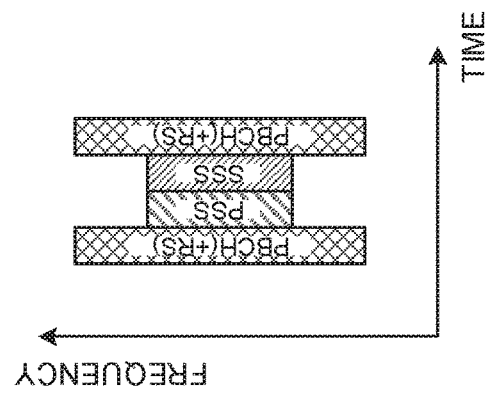

As to in what order NR-PSS, NR-SSS and NR-PBCHs are allocated, the order of NR-PSS/NR-SSS/NR-PBCH/NR-PBCH (option 1 shown in FIG. 1A), the order of NR-PSS/NR-PBCH/NR-SSS/NR-PBCH (option 2 shown in FIG. 1B), the order of NR-PBCH/NR-PSS/NR-SSS/NR-PBCH (option 3 shown in FIG. 1C), and the order of NR-PSS/NR-PBCH/NR-PBCH/NR-SSS (option 4 shown in FIG. 1D) are under study.

Also, the NR-PSS/SSS and the NR-PBCHs may be configured to be mapped to different frequency fields (or frequency bands). For example, the NR-PSS/SSS may be mapped to a first frequency field (which is comprised of, for example, 127 sequences (or 127 subcarriers)), and the NR-PBCHs may be mapped to a second frequency field (which is comprised of, for example, 288 subcarriers), which is wider than the first frequency field (see FIG. 1).

In this case, the NR-PSS/SSS are each mapped to 127 subcarriers×1 symbol, and the NR-PBCH is mapped to 288 subcarriers×2 symbols. Also, the reference signals (for example, DMRSs) for use for demodulating the NR-PBCHs may be mapped to the second frequency field. Note that the frequency fields (for example, the number of subcarriers) to constitute the NR-PSS/SSS and the NR-PBCHs are by no means limited to the above values.

The first frequency field where the NR-PSS/SSS are mapped and the second frequency field where the NR-PBCHs are mapped may be allocated to overlap each other at least partially. For example, the NR-PSS, the NR-SSS and the NR-PBCHs may be allocated so that their center frequencies coincide. This will reduce the frequency fields where UE has to perform SS block receiving processes when gaining initial access, and so on.

A base station may report time information pertaining to an SS blocks (for example, an SS block index) to a UE by using the NR-PBCH and/or reference signals (for example, DMRS) that are allocated in the same symbol where the NR-PBCH is allocated. The UE can receive the NR-PBCHs and the like contained in the SS block, and identify the time index of the SS block received.

FIG. 2 show examples of SS block formats, where each SS block is comprised of a PSS (NR-PSS), an SSS (NR-SSS) and PBCHs (NR-PBCHs) (see FIG. 2). Note that synchronization signals other than the PSS and SSS (for example, TSS (Tertiary SS)) may be included in SS blocks. FIG. 2A shows an example of SS blocks in multi-beam scenario, and FIGS. 2B and 2C show examples of SS blocks in single-beam scenario (FIG. 2B shows a DL data transmission slot, and FIG. 2C shows a UL data transmission slot).

The user terminal detects NR-PSS/SSS/PBCH corresponding to the same SS block index. The PSS, the SSS, and the PBCH that correspond to the same SS block index are associated with each other. For example, the user terminal may assume that the PSS, the SSS and the PBCH that correspond to the same SS block index are transmitted at the same antenna port (for example, in the same beam, based on the same precoding, and so forth). Note that, in the following description, the PSS, the SSS and the PBCH may be understood as meaning the PSS for NR (NR-PSS), the SSS for NR (NR-SSS) and the PBCH for NR (NR-PBCH), respectively.

A set of one or multiple SS blocks may be referred to as an "SS burst." An SS burst may be formed with SS blocks of contiguous frequency and/or time resources, or may be formed with SS blocks of non-contiguous frequency and/or time resources. It is preferable that SS bursts are transmitted in a certain cycle (which may be referred to as "SS burst cycle"). Alternatively, SS bursts may not be transmitted on a regular basis (and may be transmitted aperiodically).

Also, one or more SS bursts may be referred to as an "SS burst set (SS burst series)." For example, the base station and/or the UE may apply beam sweeping to PSS/SSS/PBCH by using one or more SS bursts included in one SS burst set, and transmit these signals. Note that SS burst sets are transmitted periodically. The UE may control receiving processes on assumption that SS burst sets are transmitted periodically (in the SS burst set cycle).

A structure may be adopted here, in which prospective locations for SS blocks are specified by the specification, on a per frequency band basis, so that the user terminal can identify the indices of SS blocks from the signals in the SS blocks. This allows the user terminal to identify SS block indices from one or more signals in SS blocks. By determining prospective locations for SS blocks in advance, it is possible to reduce the number of bits that are needed to identify radio frame timings, slot timings and the like.

For example, when the base station places an SS block index in a PBCH and transmits this to the user terminal, the user terminal can acquire the SS block index from the PBCH upon receipt. Then, the user terminal can identify the time index (the symbol number, the slot number, etc.) corresponding to the SS block index that is acquired.

Also, the maximum number of SS blocks to be contained in an SS burst set may be configured differently depending on the frequency field (frequency range). For example, it is possible that that the maximum number of SS blocks contained in an SS burst set in a first frequency range is set to 4, the maximum number of SS blocks contained in an SS burst set in a second frequency range is set to 8, and the maximum number of SS blocks contained in an SS burst set in a third frequency range is set to 64. Here, the first frequency range may be 0 to 3 GHz, the second frequency range may be 3 to 6 GHz, and the third frequency range may be 6 to 52.6 GHz.

In this case, in the first frequency range to the third frequency range, 2 bits, 3 bits and 6 bits of information are needed, respectively, to report SS block indices. When, in an SS burst set, each SS block is configured for transmission in a certain window (which is, for example, 5 ms), it is then necessary to report time information (for example, each SS block's index) to the user terminal in this certain window.

As for the method of reporting SS block indices to the user terminal, for example, a method in which SS block indices are reported in an implicit way by using signal sequences and the like (implicit indication), and a method in which SS block indices are included in the NR-PBCH and so on and reported in an explicit way (explicit indication) may be possible. In the method of reporting implicit indications, the greater the number of indices there are to be reported (for example, 64 types), the more complex processes relating to configuring the design of signals, identifying signal sequences and so forth become, which is likely to increase the load of communication.

On the other hand, according to the method of reporting explicit indications, if 2 symbols where PBCHs and DMRSs are allocated, for example, 576 REs (=288 subcarriers×2 symbols) can be used. In existing LTE systems, 288 REs of resources (=72 subcarriers×4 symbols, where 48 REs are used for CRSs) can be used for LTE-PBCHs and CRSs that are multiplexed, so that more resources are available for NR-PBCHs than for LTE-PBCHs.

Note that, in existing LTE, the symbol in which a PBCH is allocated is repeated four times in a cycle of 10 ms, so that the user terminal can receive a PBCH four times in repetition, and acquire the information contained in this PBCH.

Meanwhile, when time information (for example, SS block indices) is reported by using the PBCH contained in SS blocks and/or the like, the user terminal has to successfully receive the PBCH in order to identify the time information in SS blocks received. In particular, in order to enable quick and reliable measurements and identification of beams and/or cells on the user terminal side, techniques for receiving SS blocks and identify these SS blocks properly are needed. Also, 5G/NR are anticipated to support measurements that use the NR-PSS/SSS (for example, RRM measurements), and so it is important to acquire SS block indices, quickly and reliably, even in the event measurement reports are sent.

In this case, if, as in existing LTE systems, a method in which a user terminal receives NR-PBCHs that are transmitted in repetition is used, it takes time before acquiring SS block indices based on NR-PBCHs and so on, and this might result in a delay in communication processes. As a result of this, a decline in communication throughput might occur.

So, the present inventors have focused on the format of NR-PBCH-containing SS blocks, and come up with the idea of improving the reliability of reporting of time information by controlling the number and/or allocation of NR-PBCHs contained in SS block format, so that time information may be reported to user terminals in a small number of transmissions (for example, in one transmission (one shot)).

According to one aspect of the present invention, three or more broadcast channels, which are allocated respectively in time fields that are at least contiguous, are provided in a synchronization signal block, which contains a plurality of synchronization signals and a plurality of broadcast channels that are allocated in different time fields. For example, where there are 5 contiguous symbols, 1 NR-PSS, 1 NR-SSS, and 3 NR-PBCHs are allocated in a certain order, so that a synchronization signal block is formed.

Now, embodiments of the present invention will be described in detail below with reference to the accompanying drawings. Note that the configurations according to each embodiment may be applied individually or may be applied in combination. Also, although the following description will assume that the center frequencies of the PSS/SSS and the PBCH, which are mapped to different frequency fields, are aligned, this is by no means limiting.

Furthermore, although cases will be exemplified in the following description where the frequency field for the NR-PSS/SSS and the frequency field for the NR-PBCH are configured differently, the present invention can be equally applied to cases where the frequency field for the NR-PSS/SSS and the frequency field for the NR-PBCH are configured alike. In addition, although cases will be exemplified in the following description where 3 NR-PBCHs are allocated in an SS block, the number of NR-PBCHs is by no means limited to this. Also, at least one of symbols to which a plurality of NR-PBCHs are allocated may be configured so that only DMRS is allocated.

First Example

With a first example of the present invention, an SS block format will be described that is constituted by a certain number of contiguous time fields (for example, 5 symbols). Note that a case will be described in the following description where an SS block format is comprised of 1 NR-PSS, 1 NR-SSS and 3 NR-PBCHs, which are allocated in different time fields (for example, symbols). Also, a design will be assumed below in which demodulation reference signals (DMRSs) are allocated in time fields where NR-PBCHs are allocated.

<SS Block Format 1>

Figure 3B:
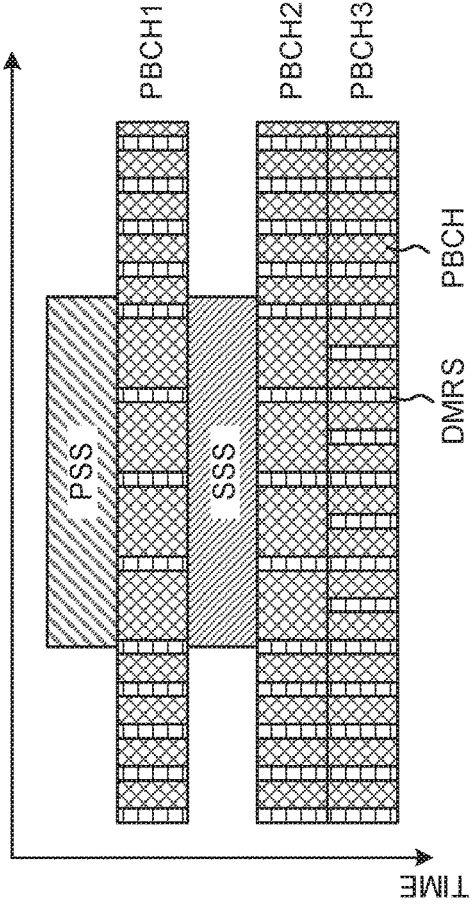
FIGS. 3A to 3C are diagrams to show examples of SS block formats according to the present embodiment.
Figure 3C:
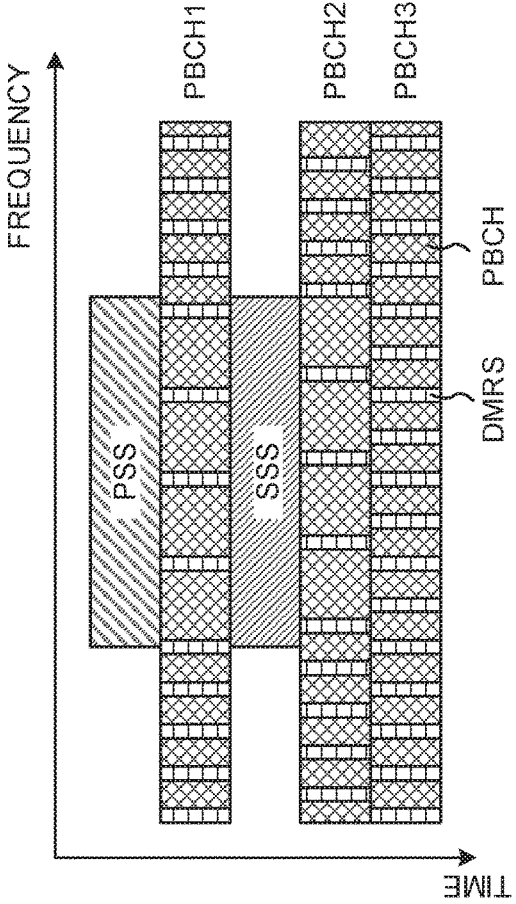
Figure 3A:
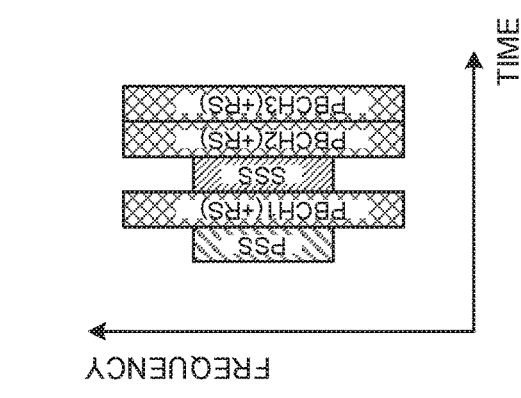

FIG. 3A shows an example of an SS block format (option 1). In SS block format 1, synchronization signals and broadcast channels are allocated to different symbols in order of PSS/PBCH 1/SSS/PBCH 2/PBCH 3. Time information pertaining to SS block format 1 (for example, SS block indices) may be included in all of PBCH 1, PBCH 2 and PBCH 3, or may be included only in some of the PBCHs (for example, in PBCH 1 and PBCH 2, in PBCH 2 and PBCH 3, in PBCH 1 alone, in PBCH 2 alone, or in PBCH 3 alone). The synchronization signals (for example, the PSS) may be used as a reference phase for PBCHs.

By including three or more PBCHs in an SS block format, even when the density of DMRSs to allocate to the same symbols with PBCHs is increased, it is still possible to reserve resources for use for PBCHs. By this means, more information can be included in PBCHs.

In SS block format 1, PBCH 1 is allocated side-by-side with the PSS and the SSS. Consequently, when the user terminal performs receiving processes (for example, channel estimation and the like) for PBCH 1, the user terminal can use the PSS and/or the SSS, in addition to DMRS 1 that is mapped to the same symbol with PBCH 1. By this means, the accuracy of channel estimation for PBCH 1 can be improved, and PBCH 1 can be received properly (for example, the rate of successful receipt can be improved).

In addition, PBCH 2 is allocated side-by-side with the SSS and PBCH 3. Consequently, when the user terminal performs receiving processes for PBCH 2, the user terminal may use the SSS and/or DMRS 3 that is mapped to the same symbol with PBCH 3, in addition to DMRS 2 that is mapped to the same symbols with PBCH 2. By this means, the accuracy of channel estimation for PBCH 2 can be improved, and PBCH 2 can be received properly.

Furthermore, PBCH 3 is allocated side-side-side with PBCH 2. Consequently, when the user terminal performs receiving processes for PBCH 3, the user terminal may use DMRS 2 that is mapped in the same symbol with PBCH 2, in addition to DMRS 3 that is mapped in the same symbol with PBCH 3. By this means, the accuracy of channel estimation for PBCH 3 can be improved, and PBCH 3 can be received properly.

DMRS 1 that is mapped in the same symbol with PBCH 1, DMRS 2 that is mapped in the same symbol with PBCH 2, and DMRS 3 that is mapped in the same symbol with PBCH 3, may have the same format or have different formats. To provide DMRSs 1 to 3 in different formats, some of DMRSs 1 to 3 may be allocated in different allocation patterns and/or allocation densities than the other DMRSs.

For example, the allocation patterns and/or the allocation densities of DMRS 1 and DMRS 2 may be configured the same, and the allocation pattern and/or the allocation density of DMRS 3 may be configured differently from those of DMRS 1 and DMRS 2. For example, the density at which DMRS 1 and DMRS 2 are allocated is made lower than the density at which DMRS 3 is allocated (see FIG. 3B). In this case, the channel estimation for PBCH 1 can be performed using DMRS 1 and the SSS (and/or the PSS), the channel estimation for PBCH 2 can be performed using DMRS 2 and the SSS (and/or DMRS 3). By this means, even if the allocation density of DMRS 1 and/or DMRS 2 is made lower than that of DMRS 3, PBCH 1 and PBCH 2 can be received properly. Note that the allocation patterns of DMRS 1 and DMRS 2 may be configured differently (for example, they may be configured with shifts in the frequency direction) (see FIG. 3C).

Furthermore, the user terminal may equalize DMRS 2 and DMRS 3 and use these when performing channel estimation for PBCH 2 (and/or PBCH 3). In this case, it is preferable to configure DMRS 2 and DMRS 3 in different allocation patterns (see FIG. 3C). By this means, DMRS can be mapped to many frequency fields and used, so that the accuracy of channel estimation can be improved.

Note that a design may be used here in which DMRSs (and/or synchronization signals) of other symbols are used in channel estimation only when the mobility of the user terminal (UE mobility) is equal to or lower than a certain value (for example, when the mobility is low). This is because, if DMRSs in other symbols are used while the moving speed of the user terminal is high, the accuracy of channel estimation might decrease.

Also, when allocating DMRSs (DMRSs 2 and 3 in FIG. 3) to symbols adjacent to synchronization signals (for example, the PSS and/or the SSS), different DMRS patterns and/or DMRS densities may be applied between frequency fields where these synchronization signals are allocated and frequency fields not overlapping with these synchronization signals. For example, the density of DMRSs in frequency fields overlapping with the synchronization signals may be selectively made lower than the density of DMRSs in frequency fields not overlapping with the synchronization signals (see FIGS. 3B and 3C). In this way, by using synchronization signals, it is possible to reduce the decline in the accuracy of channel estimation, and use increased resources for broadcast channels.

In this way, given an SS block format in which three or more PBCHs are accommodated, multiple PBCHs (+DMRSs) are allocated to at least contiguous (or adjacent) symbols, so that it is possible to use DMRSs of different symbols for channel estimation, and, consequently, improve the accuracy of channel estimation. By this means, the user terminal can properly receive PBCHs in a small number of transmissions (for example, in one shot), so that it is possible to reduce the delay that required to acquire the time information of SS blocks.

<SS Block Format 2>

Figure 4B:
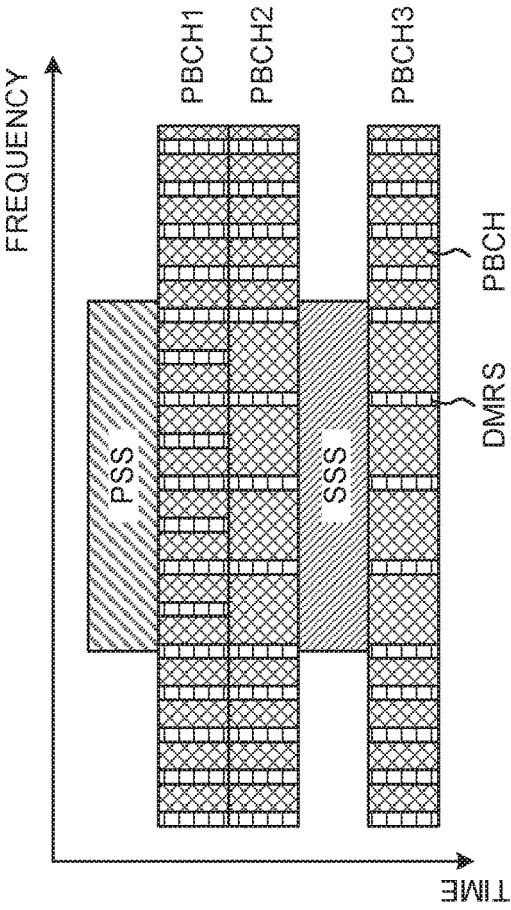
FIGS. 4A to 4C are diagrams to show other examples of SS block formats according to the present embodiment.
Figure 4C:
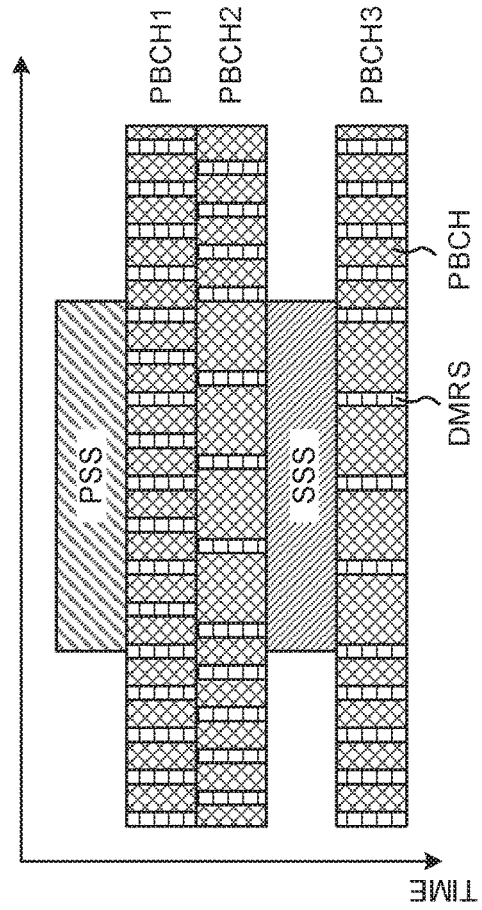
Figure 4A:
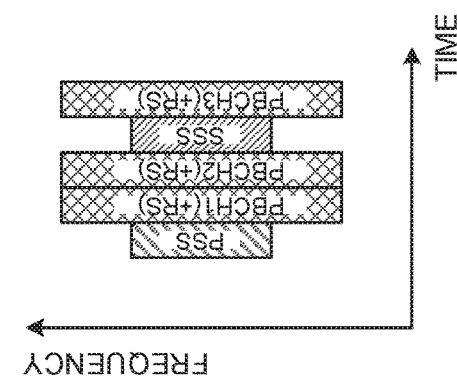

FIG. 4A shows an example of an SS block format (option 2). In SS block format 2, synchronization signals and broadcast channels are allocated to different symbols in order of PSS/PBCH1/PBCH2/SSS/PBCH3. Time information pertaining to SS block format 2 may be included in all of PBCH 1, PBCH 2 and PBCH 3, or may be included only in some of the PBCHs (for example, in PBCH 1 and PBCH 2, in PBCH 2 and PBCH 3, in PBCH 1 alone, in PBCH 2 alone, or in PBCH 3 alone). The synchronization signals (for example, the PSS) may be used as a reference phase for PBCHs.

In SS block format 2, PBCH 1 is allocated side-by-side with the PSS and the PBCH2. Consequently, when the user terminal performs receiving processes (for example, channel estimation and the like) for PBCH 1, the user terminal may use the DMRS 2 that is mapped to the same symbol with PSS and/or PBCH 2, in addition to DMRS 1 that is mapped to the same symbols with PBCH 1. By this means, the accuracy of channel estimation for PBCH 1 can be improved, and PBCH 1 can be received properly (for example, the rate of successful receipt can be improved).

Also, PBCH 2 is allocated side-by-side with PBCH 1 and the SSS. Consequently, when the user terminal performs receiving processes for PBCH 2, the user terminal may use the DMRS that is mapped to the same symbol with SSS and/or PBCH 1, in addition to DMRS 2 that is mapped to the same symbols with PBCH 2. By this means, the accuracy of channel estimation for PBCH 2 can be improved, and PBCH 2 can be received properly.

Also, PBCH 3 is allocated side-by-side with the SSS. Therefore, when the user terminal performs receiving processes for PBCH 3, the user terminal may use the SSS, in addition to DMRS 3 that is mapped to the same symbol with PBCH 3. By this means, the accuracy of channel estimation for PBCH 3 can be improved, and PBCH 3 can be received properly.

DMRS 1 that is mapped in the same symbol with PBCH 1, DMRS 2 that is mapped in the same symbol with PBCH 2, and DMRS 3 that is mapped in the same symbol with PBCH 3 may have the same format or have different formats. To provide DMRSs 1 to 3 in different formats, some of DMRSs 1 to 3 may be allocated in different allocation patterns and/or allocation densities than the other DMRSs.

For example, the allocation patterns and/or the allocation densities of DMRS 2 and DMRS 3, which are adjacent to the SSS, may be configured the same, and the allocation pattern and/or the allocation density of DMRS 1 may be configured differently from those of DMRS 2 and DMRS 3. For example, the density at which DMRS 2 and DMRS 3 are allocated is made lower than the density at which DMRS 1 is allocated (see FIG. 4B). In this case, the channel estimation for PBCH 2 can be performed using DMRS 2 and the SSS (and/or the DMRS 1), the channel estimation for PBCH 3 can be performed using DMRS 3 and the SSS. By this means, even if the allocation density of DMRS 2 and/or DMRS 3 is made lower than that of DMRS 1, PBCH 2 and PBCH 3 can be received properly. Note that the allocation patterns of DMRS 2 and DMRS 3 may be configured differently (for example, they may be configured with shifts in the frequency direction) (see FIG. 4C).

Furthermore, the user terminal may equalize DMRS 1 and DMRS 2 and use these when performing channel estimation for PBCH 2 (and/or PBCH 1). In this case, it is preferable to configure DMRS 1 and DMRS 2 in different allocation patterns (see FIG. 4B). By this means, DMRS can be mapped to many frequency fields and used, so that the accuracy of channel estimation can be improved.

Note that a design may be used here in which DMRSs (and/or synchronization signals) of other symbols are used only when the mobility of the user terminal (UE mobility) is equal to or lower than a certain value (for example, when the mobility is low). This is because, if DMRSs in other symbols are used while the moving speed of the user terminal is high, the accuracy of channel estimation might decrease.

Also, when allocating DMRSs (DMRSs 2 and 3 in FIG. 4) to symbols adjacent to synchronization signals (for example, the PSS and/or the SSS), different DMRS patterns and/or DMRS densities may be applied between frequency fields where these synchronization signals are allocated and frequency fields not overlapping with these synchronization signals. For example, the density of DMRSs in frequency fields overlapping with the synchronization signals may be selectively made lower than the density of DMRSs in frequency fields not overlapping with the synchronization signals (see FIGS. 4B and 4C). In this way, by using synchronization signals, it is possible to reduce the decline in the accuracy of channel estimation, and use increased resources for broadcast channels.

In this way, given an SS block format in which three or more PBCHs are accommodated, multiple PBCHs (+DMRSs) are allocated to at least contiguous (or adjacent) symbols, so that it is possible to use DMRSs of different symbols for channel estimation, and, consequently, improve the accuracy of channel estimation. By this means, the user terminal can properly receive PBCHs in a small number of transmissions (for example, in one shot), so that it is possible to reduce the delay that is required to acquire the time information of SS blocks.

<SS Block Format 3>

Figure 5B:
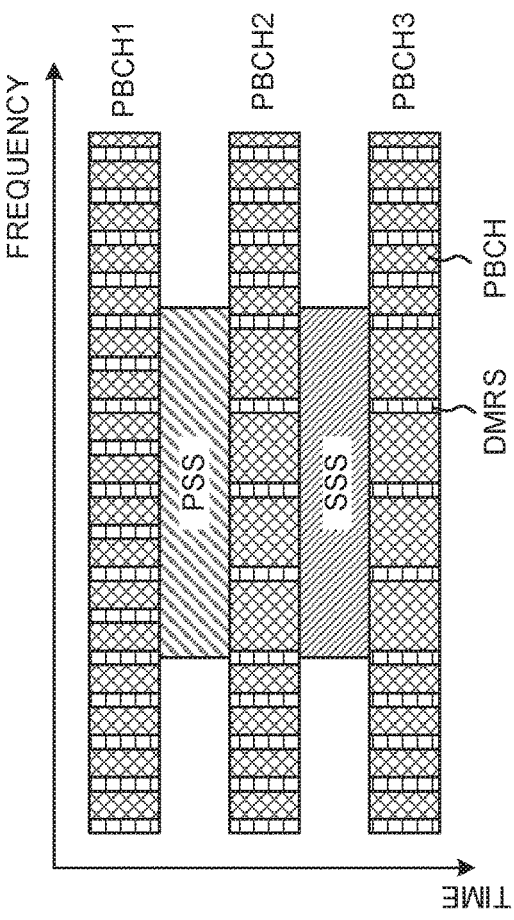
FIGS. 5A to 5C are diagrams to show other examples of SS block formats according to the present embodiment.
Figure 5C:
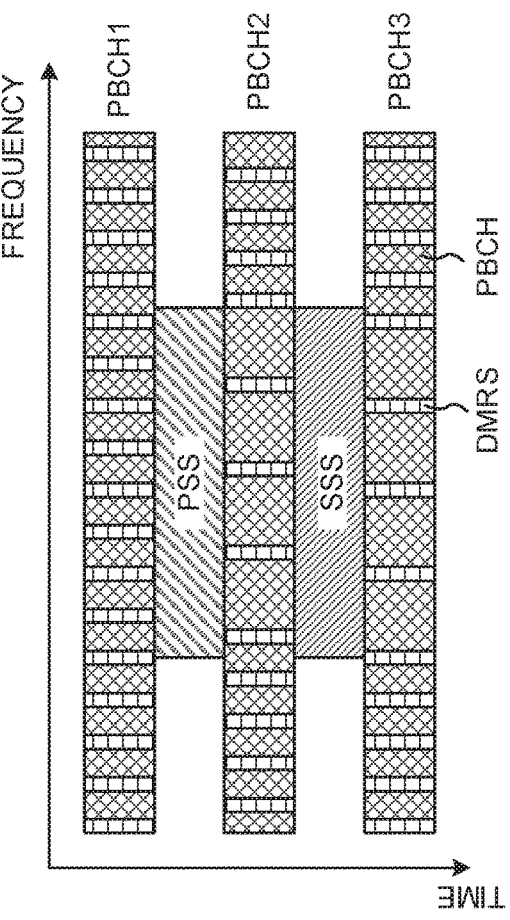
Figure 5A:
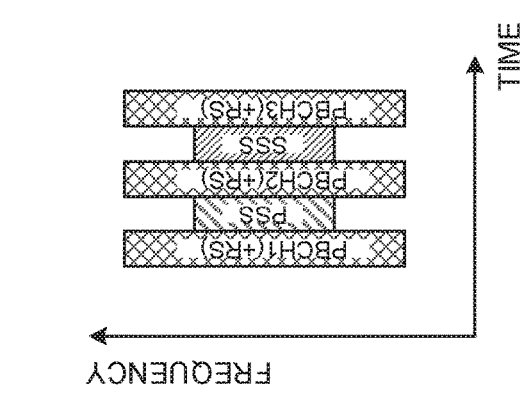

FIG. 5A shows an example of an SS block format (option 3). In SS block format 3, synchronization signals and broadcast channels are allocated to different symbols in order of PBCH1/PSS/PBCH2/SSS/PBCH3. Time information pertaining to SS block format 3 (for example, SS block indices) may be included in all of PBCH 1, PBCH 2 and PBCH 3, or may be included only in some of the PBCHs (for example, in PBCH 1 alone, in PBCH 2 alone, or in PBCH 3 alone). The synchronization signals (for example, the PSS) may be used as a reference phase for PBCHs.

In SS block format 3, PBCH 1 is allocated side-by-side with the PSS. Consequently, when the user terminal performs receiving processes (for example, channel estimation and the like) for PBCH 1, the user terminal may use the PSS, in addition to DMRS 1 that is mapped to the same symbol with PBCH 1. Also, the allocation density for DMRS 1 may be configured higher than the DMRS allocation density in other symbols. By this means, the accuracy of channel estimation for PBCH 1 can be improved, and PBCH 1 can be received properly.

In addition, PBCH 2 is allocated side-by-side with the PSS and the SSS. Consequently, when the user terminal performs receiving processes for PBCH 2, the user terminal may use the PSS and/or the SSS, in addition to DMRS 2 mapped to the same symbol with PBCH 2. By this means, the accuracy of channel estimation for PBCH 2 can be improved, and PBCH 2 can be received properly.

Furthermore, PBCH 3 is allocated side-by-side with SSS. Consequently, when the user terminal performs receiving processes for PBCH 3, the user terminal can use the SSS, in addition to DMRS 3 that is mapped to the same symbol with PBCH 3. By this means, the accuracy of channel estimation for PBCH 3 can be improved, and PBCH 3 can be received properly.

DMRS 1 that is mapped in the same symbol with PBCH 1, DMRS 2 that is mapped in the same symbol with PBCH 2, and DMRS 3 that is mapped in the same symbol with PBCH 3, may have the same format or have different formats. To provide DMRSs 1 to 3 in different formats, some of DMRSs 1 to 3 may be allocated in different allocation patterns and/or allocation densities than the other DMRSs.

For example, the allocation patterns and/or the allocation densities of DMRS 2 and DMRS 3, which are adjacent to the SSS, may be configured the same, and the allocation pattern and/or the allocation density of DMRS 1 may be configured differently from those of DMRS 2 and DMRS 3. For example, the density at which DMRS 2 and DMRS 3 are allocated is made lower than the density at which DMRS 1 is allocated (see FIG. 5B). In this case, the channel estimation for PBCH 2 can be performed using DMRS 2 and the SSS (and/or the DMRS 1), the channel estimation for PBCH 3 can be performed using DMRS 3 and the SSS. By this means, even if the allocation density of DMRS 2 and/or DMRS 3 is made lower than that of DMRS 1, PBCH 2 and PBCH 3 can be received properly. Note that the allocation patterns of DMRS 2 and DMRS 3 may be configured differently (for example, they may be configured with shifts in the frequency direction) (see FIG. 5C).

Also, when allocating DMRSs to symbols adjacent to synchronization signals (for example, the PSS and/or the SSS), different DMRS patterns and/or DMRS densities may be applied between frequency fields where these synchronization signals are allocated and frequency fields not overlapping with these synchronization signals. For example, the density of DMRSs in frequency fields overlapping with the synchronization signals may be selectively made lower than the density of DMRSs in frequency fields not overlapping with the synchronization signals (see FIGS. 5B and 5C). In this way, by using synchronization signals, it is possible to reduce the decline in the accuracy of channel estimation, and use increased resources for broadcast channels.

Second Example

Now, a case will be described below with a second example of the present invention where SS block formats are configured independently on a per frequency band (frequency range) basis. In the following description, a case will be described where the number of symbols (for example, the number of PBCHs) to be contained in an SS block format changes depending on the frequency range.

For example, if the frequency band is lower than or equal to a certain value, an SS block format that is comprised of 4 symbols is used. In this case, the SS block format is constituted by a PSS, an SSS, PBCH 1 and PBCH 2. If the frequency band is larger than the certain value, an SS block format that is comprised of 5 symbols is used. In this case, the SS block format is constituted by a PSS, an SSS, PBCH 1, PBCH 2 and PBCH 3.

Note that the demodulation DMRSs for the PBCHs included in the SS block format comprised of 4 symbols and the demodulation DMRSs for the PBCHs included in the SS block format comprised of 5 symbols may be configured in different allocation patterns and/or allocation densities. For example, the density of allocating DMRSs corresponding to PBCHs in an SS block comprised of 4 symbols may be made higher than the density of allocating DMRSs corresponding to PBCHs (at least one PBCH) in an SS block comprised of 5 symbols. That may be reversed as well.

Now, the case where the certain value for frequency band is 6 GHz and the case where it is 3 GHz will be described below.

<When Certain Value is 6 GHz>

In the frequency band of 0 to 6 GHz, the SS block is constituted by 4 contiguous symbols. In the frequency band of 0 to 6 GHz, the maximum number of SS blocks in an SS burst set is configured to, for example, 4 or 8. Consequently, it is possible to reduce the number of bits of SS block time information (for example, SS block indices) to report to the user terminal. Therefore, even when the time information is reported by using PBCHs, capacity equivalent to two PBCHs is sufficient.

In the frequency band of 6 to 52.6 GHz, an SS block is constituted by 5 contiguous symbols. In the frequency band of 6 to 52.6 GHz, the maximum number of SS blocks in an SS burst set is configured to 64, for example. Consequently, the number of bits of time information of SS blocks (for example, SS block indices) to report to the user terminal is larger than in 0 to 6 GHz. Therefore, even when the time information is reported using PBCHs, it is possible to use 3 PBCHs, and have room in capacity.

Note that a design may be used here in which the method of reporting time information of SS blocks changes depending on the frequency band (or the number of bits to report). For example, when the frequency band is lower than the certain value (0 to 6 GHz), implicit indication is used as the method of reporting time information pertaining to SS blocks. As for the method of sending implicit indications, for example, at least one of the SSS sequence pattern, the DMRS sequence pattern, the PBCH scrambling, the CRC masking, and the cyclic shift may be associated with the SS block's time information, and reported to the user terminal. In this case, the number of bits reported is 4 or 8, so that the number of signal patterns to be prepared can be reduced as well.

As for the method of reporting time information pertaining to SS blocks when the frequency band is larger than the certain value (6 to 52.6 GHz), explicit indication alone, or the combination of explicit indication and implicit indication is used. As for method of sending explicit indications, PBCH resources (PBCH bits) may be used. In this case, since the number of reporting bits is 64, at least PBCH resources are used.

In this way, by configuring the method of reporting time information of SS blocks based on the frequency band (or based on the maximum number of SS blocks), it is possible to select and use the reporting method flexibly, depending on the number of bits required.

<Certain Value is 3 GHz>

In the frequency band of 0 to 3 GHz, the SS block is constituted by 4 contiguous symbols. In the frequency band of 0 to 3 GHz, the maximum number of SS blocks in an SS burst set is configured to, for example, 4. Consequently, it is possible to reduce the number of bits of SS block time information to report to the user terminal. Therefore, even when the time information is reported by using PBCHs, capacity equivalent to two PBCHs is sufficient.

In the frequency band of 3 to 52.6 GHz, an SS block is constituted by 5 contiguous symbols. In the frequency band of 3 to 52.6 GHz, the maximum number of SS blocks in an SS burst set is configured to 8 or 64, for example. Consequently, the number of bits of time information of SS blocks to report to the user terminal is larger than in 0 to 3 GHz.

Therefore, even when the time information is reported using PBCHs, it is possible to use 3 PBCHs, and have room in capacity.

Note that a design may be used here in which the method of reporting time information of SS blocks changes depending on the frequency band (or the number of bits to report). For example, when the frequency band is lower than the certain value (0 to 3 GHz), implicit indication is used as the method of reporting time information pertaining to SS blocks. As for the method of reporting time information pertaining to SS blocks when the frequency band is larger than the certain value (3 to 52.6 GHz), explicit indication alone, or the combination of explicit indication and implicit indication is used. As for method of sending explicit indications, PBCH resources (bits) may be used.

In this way, by configuring the method of reporting time information of SS blocks based on the frequency band (or based on the maximum number of SS blocks), it is possible to select and use the reporting method flexibly, depending on the number of bits required.

Third Example

A case will be described below with a third example of the invention where the locations to allocate SS blocks (prospective locations) are configured in advance.

Assuming that an SS block is formed with 5 contiguous symbols, prospective locations where this SS block can be allocated are configured in advance. Prospective locations for SS blocks may be defined in advance in the specification, or may be reported to the user terminal. Also, prospective locations for SS blocks that are common between frequency bands may be set, or independent prospective locations of SS blocks may be set per frequency band.

For example, the prospective location of the SS block is provided at a certain location within a certain time unit (for example, slot, minislot, or subframe). For example, given a slot that is formed with 14 symbols, prospective locations for an SS block that is formed with 5 symbols are provided in the third to seventh symbols and the eighth to twelfth symbols. In this case, the other symbols (for example, the first, second, thirteenth and fourteenth symbols) may be used to transmit other signals.

Also, regardless of what subcarrier spacing is used when transmitting this SS block, the SS block's prospective locations may be configured in the same symbol indices in the slot. For example, the subcarrier spacing to use when transmitting the SS block may be, for example, at least one of 15 kHz, 30 kHz, 60 kHz, 120 kHz and 240 kHz. Obviously, the applicable subcarrier spacing is not limited to this.

Generally, subcarrier spacing and symbol duration hold a reciprocal relationship. Therefore, as long as the number of symbols per slot (or minislot (subslot)) stays the same, the higher (wider) the subcarrier spacing, the shorter the slot length, and the lower (narrower) the subcarrier spacing, the longer the slot length. Now, cases will be described below in which an SS blocks that is formed with 5 contiguous symbols is transmitted at a subcarrier spacing of 15 kHz (see FIG. 6A) transmitted at subcarrier spacings of 30 kHz or 120 kHz (see FIG. 6B), and transmitted at a subcarrier spacing of 240 kHz (see FIG. 6C).

FIG. 6A shows a case where, when an SS block is transmitted at a subcarrier spacing of 15 kHz, prospective locations for allocating the SS block are provided at certain locations in one slot (14 symbols). In the case shown here, in the third to seventh symbols and in the eighth to twelfth symbols, prospective locations (#0 and #1) for the SS block are provided, respectively. Other signals are allocated in the other symbols (the first, second, thirteenth and fourteenth symbols). For example, it may be possible to allocate a downlink control channel to the first and second symbols, allocate a UL signal (for example, an uplink control channel) to the fourteenth symbol, and make the thirteenth symbol a gap.

In the event data signals and/or other signals are transmitted at different subcarrier spacings (for example, 30 kHz, 60 kHz, etc.), a design may be used in which no other signals (downlink control information, UL signals, etc.) are allocated to the time fields that overlap the prospective locations of the SS block. By this means, it is possible to prevent the SS block and control channels and the like from interfering with each other.

FIG. 6B shows a case where when an SS block is transmitted at a subcarrier spacing of 30 kHz or 120 kHz, prospective locations for allocating the SS block are provided at certain locations in one slot (14 symbols). In the case shown here, in the third to seventh symbols and in the eighth to twelfth symbols, prospective locations (#0, #1, #2 and #3) for the SS block are provided, respectively. Other signals are allocated in the other symbols (the first, second, thirteenth and fourteenth symbols). For example, it may be possible to allocate a downlink control channel to the first and second symbols, allocate a UL signal (for example, an uplink control channel) to the fourteenth symbol, and make the thirteenth symbol a gap.

In the event data signals and/or other signals are transmitted at different subcarrier spacings (for example, 15 kHz, 60 kHz, etc.), a design may be used in which no other signals (downlink control information, UL signals, etc.) are allocated to the time fields that overlap the prospective locations for the SS block using 30 kHz. By this means, it is possible to prevent the SS block and control channels and the like from interfering with each other.

FIG. 6C shows a case where when an SS block is transmitted at a subcarrier spacing of 240 kHz, prospective locations for allocating the SS block are provided at certain locations in one slot (14 symbols). In the case shown here, in the fifth to ninth symbols and in the tenth to fourteenth symbols, prospective locations (#0, #1, #2, #3, #4, #5, #6 and #7) for the SS block are provided, respectively. Note that it might occur that the 240 kHz-subcarrier spacing is not used for data transmission. In this case, the other symbols (the first, second, thirteenth and fourteenth symbols) may be made blank, or signals other than data signals may be allocated there.

In the event data signals and/or other signals are transmitted at different subcarrier spacings (for example, 60 kHz, 120 kHz, etc.), a design may be used in which no other signals (downlink control information, UL signals, etc.) are allocated to the time fields that overlap the prospective locations of the SS block using 240 kHz. In the instant case, a design is used in which no prospective SS block locations are provided in the top field of the slot (the first to fourth symbols), so that it possible to avoid, effectively, interference with, for example, downlink control information that is transmitted at the top of slots using other subcarrier spacings.

Note that, although FIG. 6 have shown prospective locations on assumption that an SS block is constituted by 5 contiguous symbols, if 4 contiguous symbols constitute an SS block, separate prospective location for the SS block may be configured as well. For example, the starting position of a prospective location for an SS block comprised of 4 symbols may be configured differently from the starting position of a prospective location for an SS block comprised of 5 symbols. In this case, a prospective location for the SS block comprised of 4 symbols may be provided within the range of prospective locations for the SS block comprised of 5 symbols.

Fourth Example

A case will be described below with a fourth example of the present invention where, in an SS block, some symbols among a plurality of symbols where PBCHs are allocated (PBCH symbols) are used to report the SS block's time information.

For example, time information of this SS block is reported to the user terminal by using a certain PBCH among a plurality of PBCHs included in the SS block. The certain PBCH may be, for example, one PBCH (PBCH 3 in FIG. 3 to FIG. 5) allocated at the end in the time direction. In this case, the SS block's time information alone may be reported to the user terminal by using PBCH 3, and other pieces of system information (for example, the content of the MIB) may be reported to the user terminal by using PBCH 1 and PBCH 2. Note that time information and system information may be included in PBCH 3.

Alternatively, where a plurality of PBCH symbols are included in an SS block, a DMRS that is allocated to a certain symbol may be used to report time information of the SS block to the user terminal. The certain symbols may be that of the DMRS (DMRS 3 in FIG. 3 to FIG. 5) allocated at the end in the time direction, or may be that of at least one DMRS that is mapped to a symbol adjacent to a synchronization signal (for example, SSS).

In this case, certain DMRSs allocated to these certain symbols may be configured differently than DMRSs allocated to other symbols. For example, at least one of the sequence, the allocation pattern and the allocation density of a certain DMRS that is used to report time information may be configured differently than other DMRSs. For example, the user terminal may select the format for a certain DMRS based on time information that is reported, and select the format for other DMRSs based on certain conditions (for example, cell IDs). In this case, the user terminal controls receipt of other DMRSs based on cell IDs and the like, and identifies the time information of SS blocks based on the format of the certain DMRS.

Furthermore, when time information is reported using a certain PBCH and/or a certain DMRS, the frequency field where the certain PBCH and/or the certain DMRS that are used to report the time information are allocated (the frequency field used for transmission) may be limited. For example, the frequency field for the certain PBCH and/or the certain DMRS containing the time information may be the same as the frequency field for the synchronization signals (PSS and/or SSS) or may be narrower than the frequency field for the synchronization signals (see FIGS. 7A and 7B).

Figure 7A:
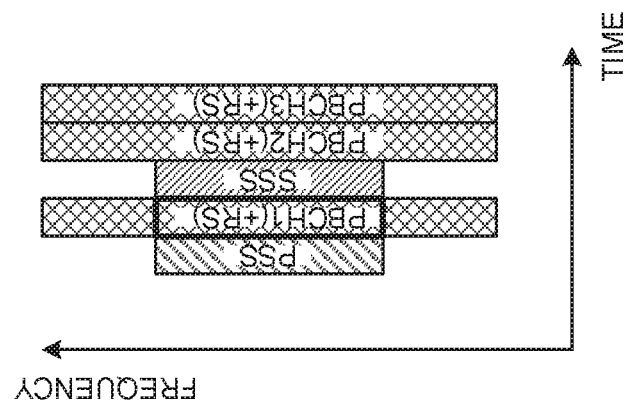
FIGS. 7A and 7B are diagrams to show examples of methods of allocating time information to SS blocks according to the present embodiment.
Figure 7B:
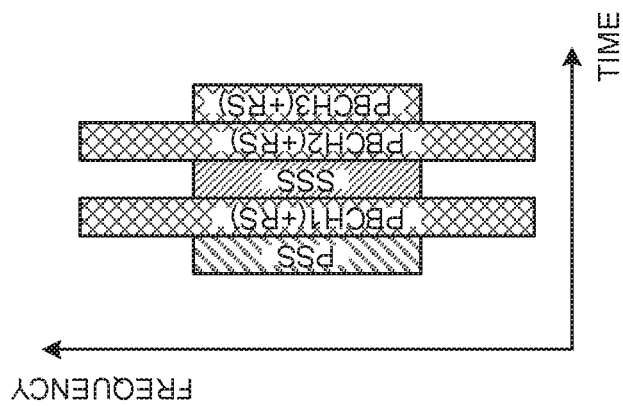

FIG. 7A shows a case where the frequency field of PBCH 3 for reporting an SS block's time information is configured the same as that of the PSS/SSS. FIG. 7B shows a case where, in the symbol where PBCH 1 is mapped, time information is reported using the PBCH and/or the DMRS included in the range of frequency field over which the PSS/SSS is allocated.

By this means, when an operation is carried out in which the user terminal has only to detect synchronization signals and acquire the time information (for example, operation in which only the time information contained in the PBCH is needed), the user terminal can monitor only the frequency field where the synchronization signals are allocated, and acquire the time information such as SS block indices. As a result of this, the frequency fields the user terminal has to monitor can be reduced, so that the load of receiving processes in the user terminal can be reduced. Note that operations in which the user terminal only needs to detect synchronization signals and acquire time information may include, for example, measurement operations (for example, RRM measurements) to use synchronization signals (PSS and/or SSS).

(Radio Communication System)

Now, the structure of the radio communication system according to one embodiment of the present invention will be described below. In this radio communication system, communication is performed using one or a combination of the herein-contained embodiments of the present invention.

Figure 8:
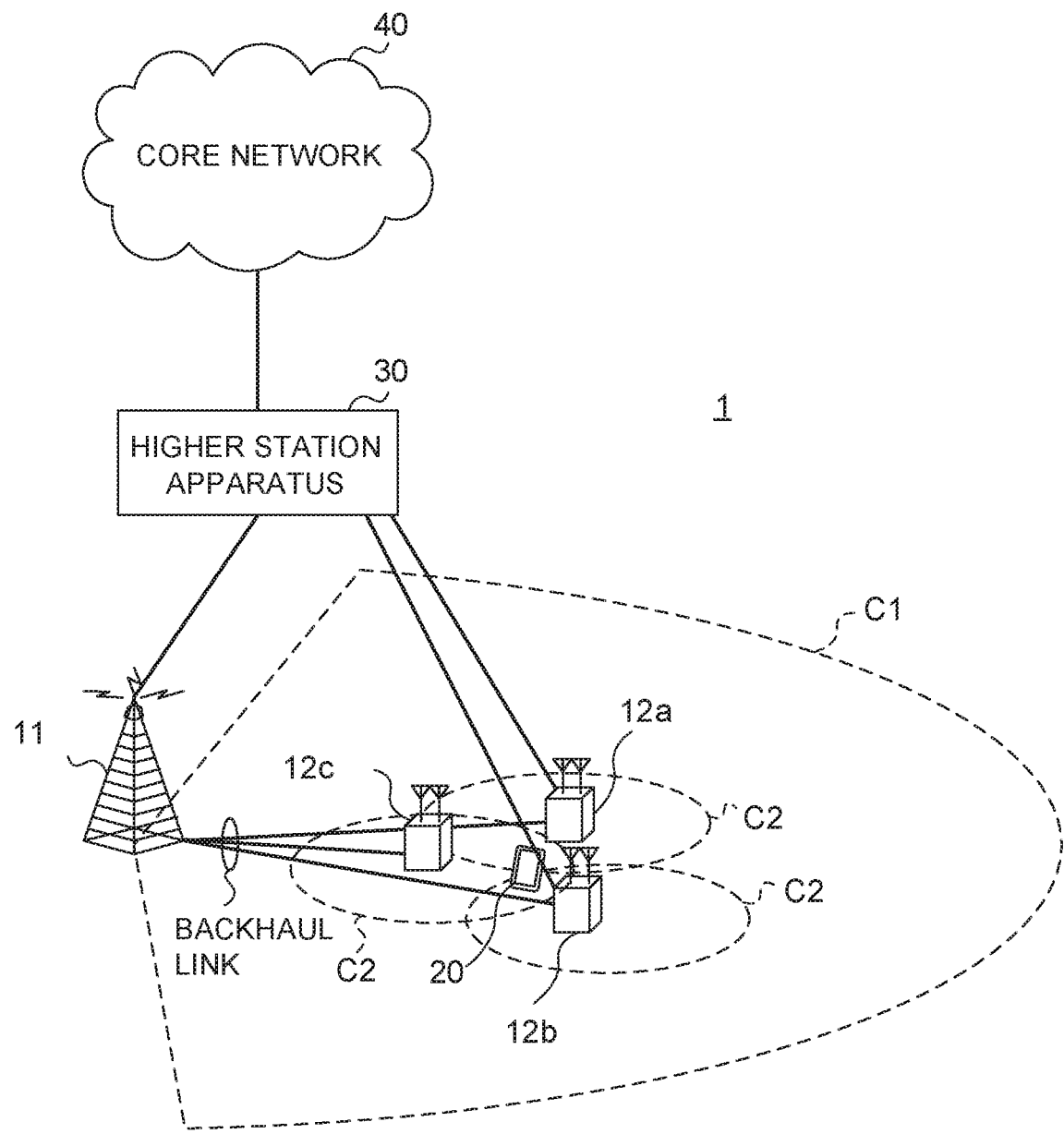
FIG. 8 is a diagram to show an exemplary schematic structure of a radio communication system according to one embodiment of the present invention.

FIG. 8 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G, "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs). For example, in DC, the MeNB (MCG) communicates by using LTE cells, and SeNBs (SCGs) communicate by using NR/5G cells.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to this combination, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH. A shared control channel that reports the presence or absence of a paging channel is mapped to a downlink L1/L2 control channel (for example, PDCCH), and the paging channel (PCH) data is mapped to the PDSCH. Downlink reference signals, uplink reference signals and physical downlink synchronization signals are allocated separately.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated in the PUSCH. Also, downlink radio quality information (CQI (Channel Quality Indicator)), delivery acknowledgement information and so on are communicated by the PUCCH. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 9:
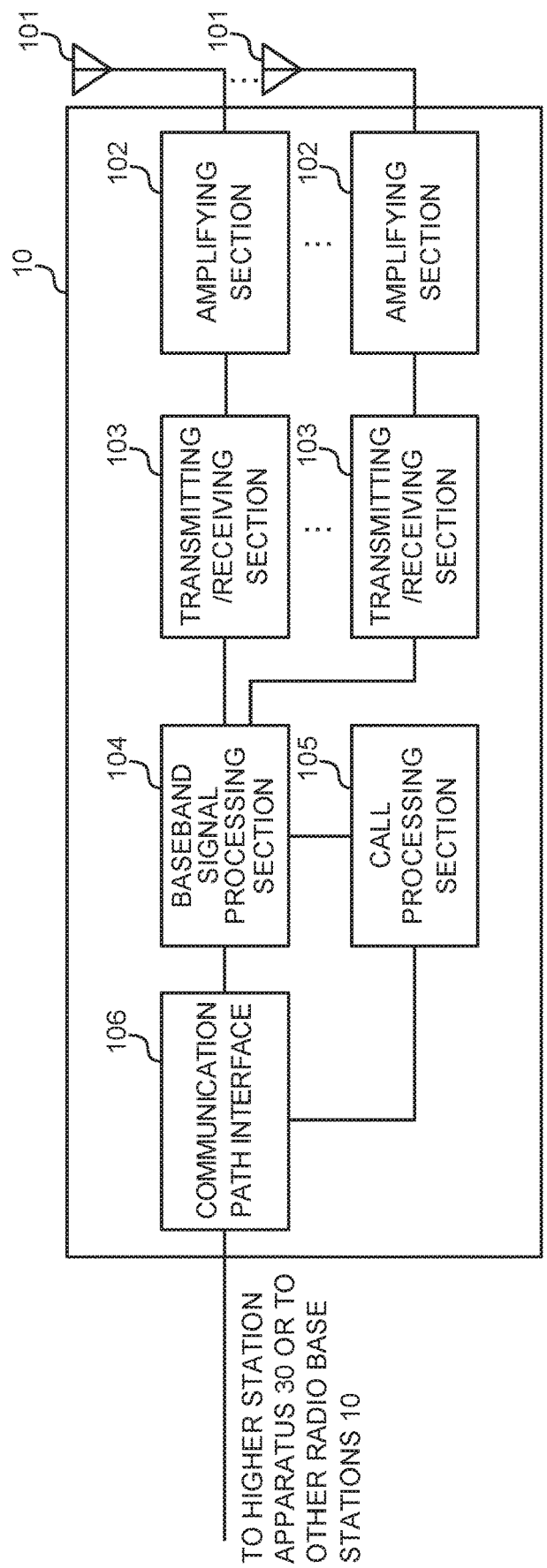
FIG. 9 is a diagram to show an exemplary overall structure of radio base station according to one embodiment of the present invention.

FIG. 9 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

The communication path interface section 106 transmits and receives signals to and from the higher station apparatus 30 via a certain interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit a synchronization signal block, which contains a plurality of synchronization signals and a plurality of broadcast channels that are allocated to different time fields, respectively. Also, the transmitting/receiving sections 103 transmit time information of the synchronization signal block by using a broadcast channel and/or a demodulation reference signal that is allocated in the same time field with the broadcast channel. Also, the transmitting/receiving sections 103 transmit a synchronization signal block, in which broadcast channels are allocated in three or more time fields, in a frequency band of a certain frequency or above.

Figure 10:
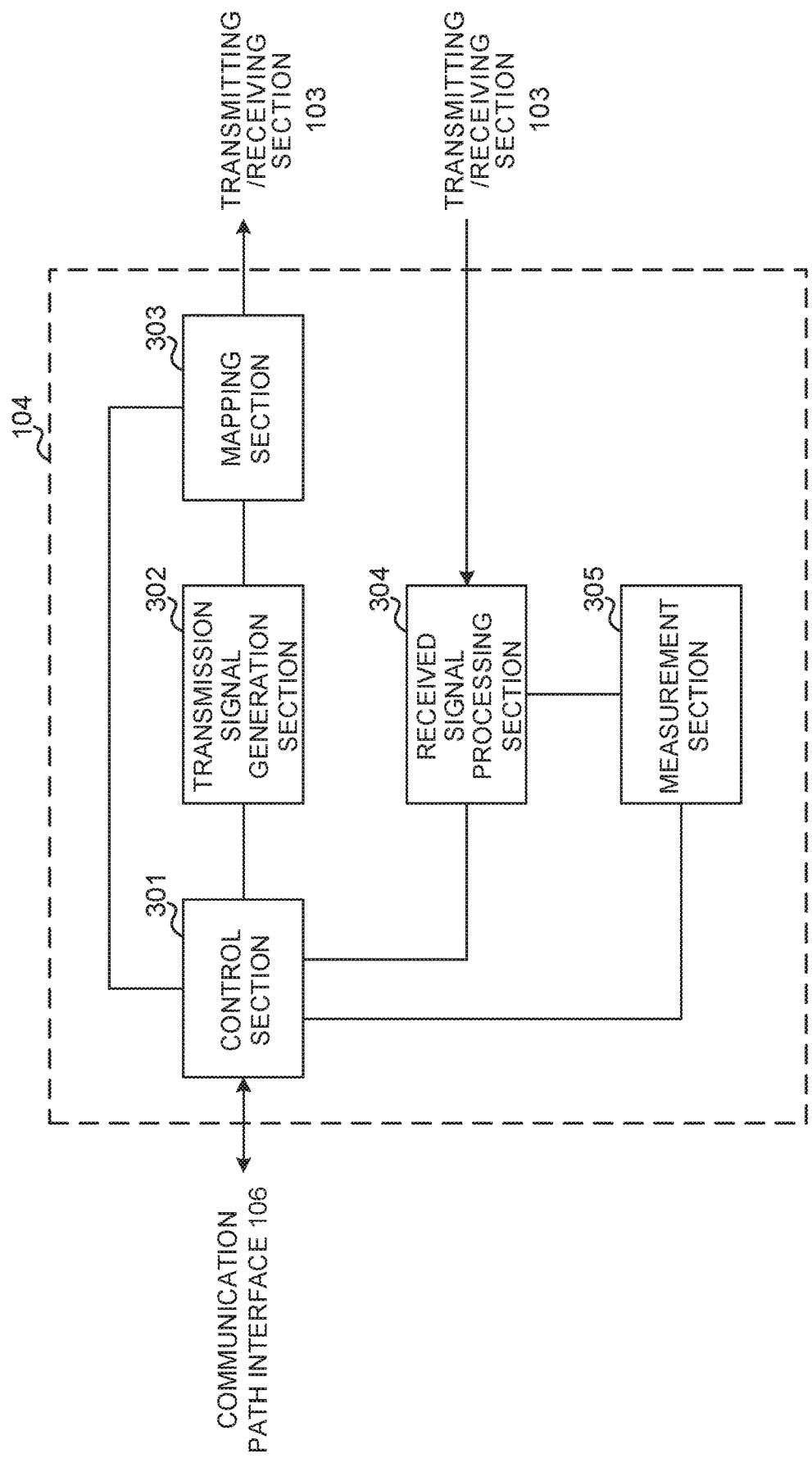
FIG. 10 is a diagram to show an exemplary functional structure of radio base station according to one embodiment of the present invention.

FIG. 10 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104. The baseband signal processing section 104 has digital beamforming functions for providing digital beamforming.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302 (including signals that correspond to synchronization signals, the MIB, paging channels, and broadcast channels and so on), allocation of signals in the mapping section 303, and so on.

The control section 301 controls generation and transmission of a synchronization signal block, in which broadcast channels are allocated in three or more time fields, including at least contiguous time fields, respectively. Also, the control section 301 controls mapping and transmission so that the allocation patterns and allocation densities of demodulation reference signals, allocated respectively in time fields where broadcast channels are allocated contiguously, vary.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are selected based on, for example, channel state information (CSI) from each user terminal 20.

The mapping section 303 maps the downlink signals generated in the transmission signal generation section 302 to certain radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signal. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), the SINR (Signal to Interference plus Noise Ratio), channel states and so on of the received signals. The measurement results may be output to the control section 301.

(User Terminal)

Figure 11:
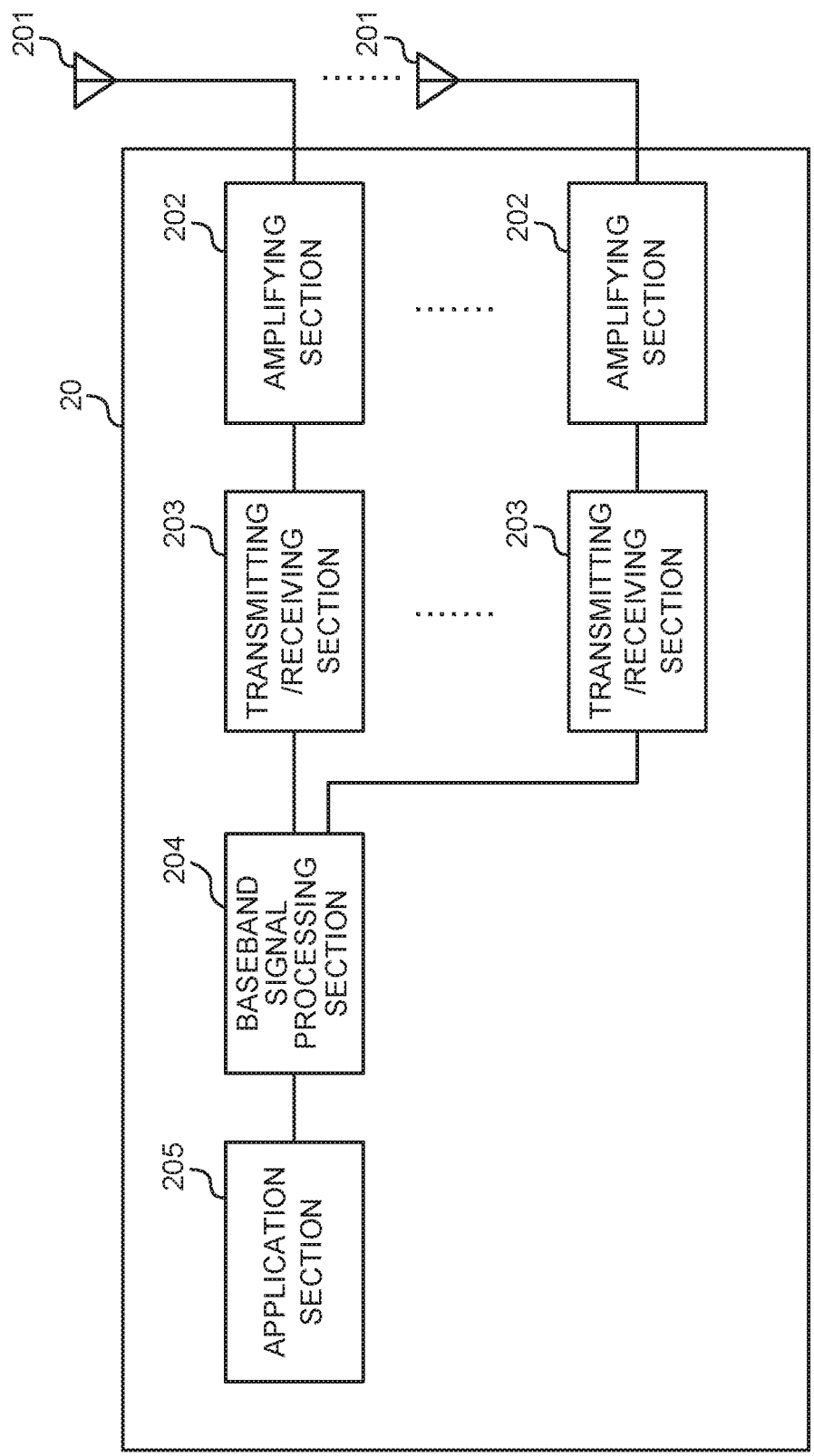
FIG. 11 is a diagram to show an exemplary overall structure of a user terminal according to one embodiment of the present invention.

FIG. 11 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 receive a synchronization signal block, which contains a plurality of synchronization signals and a plurality of broadcast channels that are allocated to different time fields, respectively. Also, the transmitting/receiving sections 203 receive time information of the synchronization signal block, which is included in a broadcast channel and/or a demodulation reference signal that is allocated in the same time field with the broadcast channel. In addition, the transmitting/receiving sections 203 receive a synchronization signal block, in which broadcast channels are allocated in three or more time fields, in a frequency band of a certain frequency or above.

Figure 12:
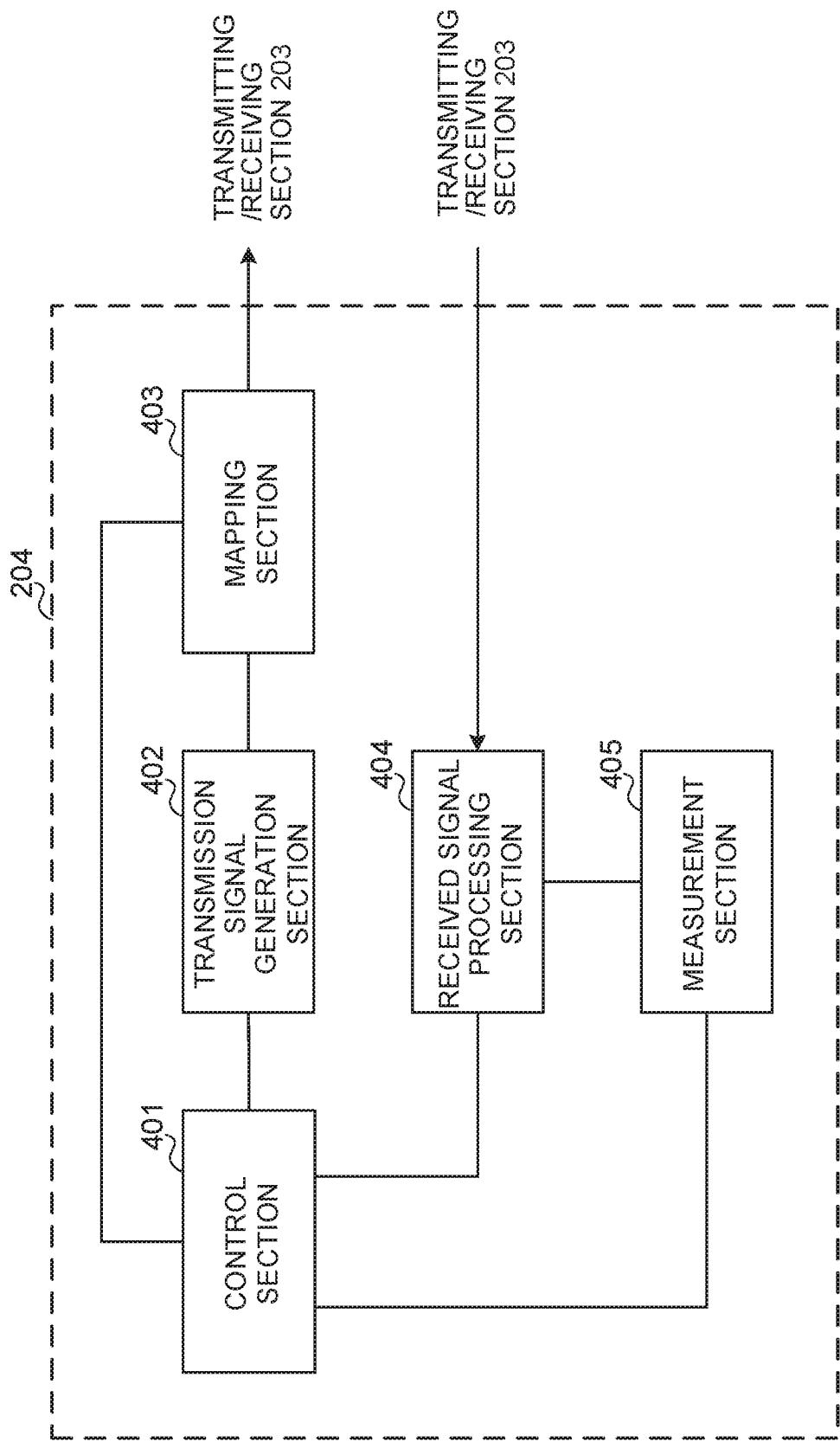
FIG. 12 is a diagram to show an exemplary functional structure of a user terminal according to one embodiment of the present invention.

FIG. 12 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 exerts control so that time information of a synchronization signal block is selected (or acquired) based on a broadcast channel and/or a demodulation reference signal allocated in the same time field with the broadcast channel. The control section 401 also exerts control so that a synchronization signal block, in which broadcast channels are allocated in three or more time fields, is received in a frequency band of a certain frequency or above. In addition, the control section 401 exerts control so that a synchronization signal block is received on assumption the synchronization signal block is allocated to a certain field in a slot (see FIG. 6).

In addition, the control section 401 selects the time information pertaining to a synchronization signal block based on a broadcast channel that is allocated to a specific time field, among a plurality of broadcast channels included in the synchronization signal block (see FIG. 7). In addition, the control section 401 selects time information of a synchronization signal block based on broadcast channels and/or demodulation reference signals that are allocated in the same frequency fields with multiple synchronization signals.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information and/or channel state information (CSI) based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

As commanded by the control section 401, the received signal processing section 404 receives synchronization signals and broadcast channels, which the radio base station transmits by applying beamforming. In particular, the received signal processing section 404 receives the synchronization signal and broadcast channel that are allocated to at least one of a plurality of time fields (for example, symbols) that constitute a certain transmission time interval (for example, a subframe or a slot).

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, signals after the receiving processes and so on, to the measurement section 405.

The measurement section 405 conducts measurements with respect to the received signals. For example, the measurement section 405 conducts measurements using beamforming RSs transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR, etc.), downlink channel information (for example, CSI) and so on of the received signals. The measurement results may be output to the control section 401. For example, the measurement section 405 performs RRM measurements using synchronization signals.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 13:
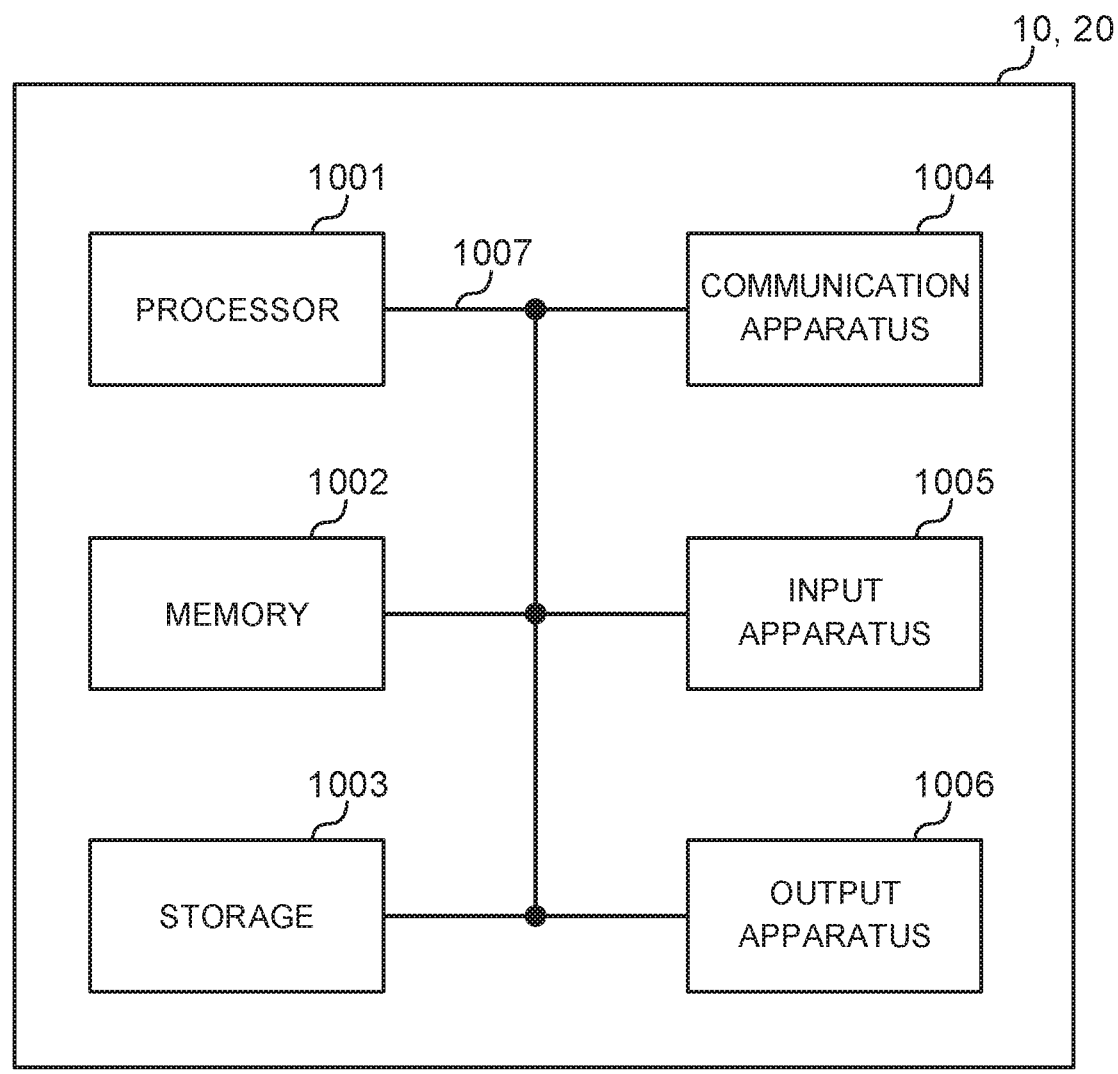
FIG. 13 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 13 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

Each function of the radio base station 10 and user terminal 20 is implemented by allowing certain software (programs) to be read on hardware such as the processor 1001 and the memory 1002, and by allowing the processor 1001 to do calculations, the communication apparatus 1004 to communicate, the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and others may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frame, a subframe, a slot and a symbol may be each called by other applicable names. For example, 1 subframe may be referred to as a "transmission time interval (TTI)," a plurality of consecutive subframes may be referred to as a "TTI," or 1 slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms.

Here, a TTI refers to the minimum time unit of scheduling in radio communication, for example. For example, in LTE systems, a radio base station schedules the radio resources (such as the frequency bandwidth and/or transmission power that can be used in each user terminal) to allocate to each user terminal in TTI units. Note that the definition of TTIs is not limited to this. The TTI may be the transmission time unit of channel-encoded data packets (transport blocks), code blocks and/or codewords, or may be the unit of processing in scheduling, link adaptation and so on.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 subframe or one TTI in length. One TTI and 1 subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, 1 RE may be a radio resource field of 1 subcarrier and 1 symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to certain values, or may be represented in other information formats. For example, radio resources may be specified by certain indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of certain information (for example, reporting of information to the effect that "X holds") does not necessarily have to be sent explicitly, and can be sent implicitly (by, for example, not reporting this piece of information, or by reporting a different piece of information).

Decisions may be made in values represented by one bit (0 or 1), may be made in Boolean values that represent true or false, or may be made by comparing numerical values (for example, comparison against a certain value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may also be referred to as, for example, a "subscriber station," a "mobile unit," a "subscriber unit," a "wireless unit," a "remote unit," a "mobile device," a "wireless device," a "wireless communication device," a "remote device," a "mobile subscriber station," an "access terminal," a "mobile terminal," a "wireless terminal," a "remote terminal," a "handset," a "user agent," a "mobile client," a "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and/or "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
 a receiver that receives a synchronization signal block including a synchronization signal and a broadcast channel; and
 a processor that, when a carrier frequency is smaller than or equal to a given value, determines an index of the synchronization signal block based on a subcarrier spacing, and based on a frequency range and a demodulation reference signal sequence for the broadcast channel, and that when the carrier frequency is larger than the given value, determines an index of the synchronization signal block based on the subcarrier spacing, and based on the demodulation reference signal sequence and bits of the broadcast channel.

2. The terminal according to claim 1, wherein the synchronization signal block has a different symbol configuration per frequency range.

3. A radio communication method for a terminal, comprising:
 receiving a synchronization signal block including a synchronization signal and a broadcast channel; and
 when a carrier frequency is smaller than or equal to a given value, determining an index of the synchronization signal block based on a subcarrier spacing, and based on a frequency range and a demodulation reference signal sequence for the broadcast channel, and when the carrier frequency is larger than the given value, determining an index of the synchronization signal block based on the subcarrier spacing, and based on the demodulation reference signal sequence and bits of the broadcast channel.

4. The terminal according to claim 1, wherein the processor determines the index of the synchronization signal block based on the broadcast channel of one symbol among a plurality of symbols included in the synchronization signal block.

5. The terminal according to claim 2, wherein the processor determines the index of the synchronization signal block based on the broadcast channel of one symbol among a plurality of symbols included in the synchronization signal block.

6. A base station comprising:
a processor that, when a carrier frequency is smaller than or equal to a given value, generates a demodulation reference signal sequence for a broadcast channel based on an index of a synchronization signal block, which is determined by a subcarrier spacing, and by a frequency range, including a synchronization signal and the broadcast channel and that when the carrier frequency is larger than the given value, generates the demodulation reference signal sequence for the broadcast channel and bits of the broadcast channel based on the index of the synchronization signal block, which is determined by the subcarrier spacing; and
a transmitter that transmits the synchronization signal block.

7. A system comprising:
a terminal that comprises:
a receiver that receives a synchronization signal block including a synchronization signal and a broadcast channel; and
a processor of the terminal that, when a carrier frequency is smaller than or equal to a given value, determines an index of the synchronization signal block based on a subcarrier spacing, and based on a frequency range and a demodulation reference signal sequence for the broadcast channel, and that when the carrier frequency is larger than the given value, determines an index of the synchronization signal block based on the subcarrier spacing, and based on the demodulation reference signal sequence and bits of the broadcast channel; and
a base station that comprises:
a processor of the base station that when the carrier frequency is smaller than or equal to the given value, generates the demodulation reference signal sequence for the broadcast channel based on the index of the synchronization signal block, which is determined by the subcarrier spacing, and by the frequency range, and that when the carrier frequency is larger than the given value, generates the demodulation reference signal sequence for the broadcast channel and the bits of the broadcast channel based on the index of the synchronization signal block, which is determined by the subcarrier spacing; and
a transmitter that transmits the synchronization signal block.

* * * * *